United States Patent
Kashiwazaki

(12) 
(10) Patent No.: US 6,236,755 B1
(45) Date of Patent: *May 22, 2001

(54) OUTPUT METHOD AND APPARATUS

(75) Inventor: Masami Kashiwazaki, Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 07/872,171

(22) Filed: Apr. 22, 1992

(30) Foreign Application Priority Data

Apr. 23, 1991 (JP) .................................................. 3-092296

(51) Int. Cl.[7] .............................. G06K 9/36; G06T 9/00
(52) U.S. Cl. .......................... 382/239; 382/244; 382/248; 358/1.15; 358/1.17
(58) Field of Search ............................. 382/56, 232, 305, 382/239, 250, 244, 248; 358/401, 403, 432, 433, 1.15, 1.16, 1.17; 395/114, 115, 116

(56) References Cited

U.S. PATENT DOCUMENTS

| | | | |
|---|---|---|---|
| 4,009,332 | * | 2/1977 | Van Hook ............................. 358/1.16 |
| 4,510,619 | * | 4/1985 | LeBrun et al. ........................ 382/306 |
| 4,587,633 | * | 5/1986 | Wang et al. ........................... 709/234 |
| 4,754,492 | * | 6/1988 | Malvar ................................... 382/250 |
| 4,984,076 | | 1/1991 | Watanabe et al. ................. 375/240.2 |
| 5,014,198 | * | 5/1991 | Umemura ................................ 382/250 |
| 5,016,114 | * | 5/1991 | Sakata et al. ........................... 358/401 |
| 5,018,080 | * | 5/1991 | Inoue .................................... 358/1.15 |
| 5,048,112 | * | 9/1991 | Alves et al. ........................... 382/233 |
| 5,150,454 | * | 9/1992 | Wood et al. ........................... 395/1.15 |
| 5,150,455 | * | 9/1992 | Morikawa et al. .................. 358/1.15 |
| 5,150,462 | * | 9/1992 | Takeda et al. ......................... 345/508 |
| 5,204,756 | * | 4/1993 | Chevion et al. ....................... 358/467 |
| 5,249,053 | * | 9/1993 | Jain ..................................... 375/240.2 |
| 5,337,319 | * | 8/1994 | Furukawa et al. ................... 358/1.15 |
| 5,377,312 | * | 12/1994 | Kobayashi ........................... 358/1.17 |
| 5,819,014 | * | 10/1998 | Cyr et al. ............................. 358/1.15 |

FOREIGN PATENT DOCUMENTS

| | | |
|---|---|---|
| 378316 | 7/1990 | (EP) . |
| 2-30561 | 1/1990 | (JP) . |
| 2-178826 | 7/1990 | (JP) . |

* cited by examiner

*Primary Examiner*—Jon Chang
(74) *Attorney, Agent, or Firm*—Fitzpatrick, Cella, Harper & Scinto

(57) ABSTRACT

A method and apparatus for outputting an image in which the image is divided into plural parts which are serially processed. Each part in turn is compressed in accordance with a first compression method, the same part is selectably recompressed by a second compression method in accordance with the compression results, the method by which the part was compressed is stored, the compressed part is expanded into a memory area that is common for all parts of the image in accordance with the stored compression method, and the expanded image is output.

38 Claims, 8 Drawing Sheets

OUTPUT METHOD AND APPARATUS

BACKGROUND OF THE INVENTION

1. Field of the Invention

This invention relates to an output method and apparatus for outputting an image in accordance with data input from an external apparatus, such as a host computer or the like.

2. Description of the Related Art

FIG. 2 is a block diagram showing the flow of processing in a control unit 1 of a conventional output apparatus such as a printing apparatus.

In FIG. 2, an external apparatus 2 outputs print data from a host computer or the like. An input unit 3 receives the data. An analyzing unit 4 analyzes input data. A developing unit 5 develops data into an output image, for example, in the form of a bit-map memory according to analysis of the analyzing unit 4. A frame memory 6 stores the developed output image, and comprises a RAM (random access memory). An output unit 7 controls an output mechanism 8, such as a laser-beam printer or the like, in accordance with the data stored in the frame memory 6 so as to cause the output mechanism 8 to output the data onto recording medium 9 such as paper or the like.

In the control unit 1, print data output from the external apparatus 2 are received by the input unit 3, and are analyzed by the analyzing unit 4. According to the result of the analysis, the developing unit 5 forms an output image, for example, in the form of a binary bit-map memory for one page in the frame memory 6. The output unit 7 performs, for example, on/off control of a laser beam for the output mechanism 8 in accordance with the data stored in the frame memory 6, whereby a print result is recorded on the recording medium 9.

Because of the large memory capacity needed for frame memory 6, such a conventional approach is not satisfactory. Specifically, since data are stored in the frame memory 6 in the form of a bit-map memory or the like which is convenient for development, a very large capacity is needed for the frame memory 6. For example, if the user desires to develop a black-and-white A4-size image with a resolution of 600 dpi (dots per inch), a binary bit-map memory with a capacity of about 4 megabytes is needed for one page. In order to deal with a multivalue output or a color output, a binary bit-map memory with a capacity of several times the above-described value is needed.

SUMMARY OF THE INVENTION

The present invention has been made in order to solve the above-described problems.

It is An object of the present invention to provide an output apparatus for outputting data after developing an output image in a memory, for example, in the form of a bit map or the like. The apparatus comprises means for controlling a memory for developing an image, for example, in the form of a bit map or the like by dividing the memory, means for developing an output image in the divided memory, means for compressing data stored in the divided memory, means for performing recompression by changing to a more-efficient method of compression when the compression ratio in the compression is insufficient, storage means for storing the divided compressed memory, storage means for storing methods of compression for respective compressed portions, and means for expanding the compressed memory to the original divided part.

It is another object of the present invention to provide an output method and apparatus, wherein a memory stores data to be developed that is compressed and divided into a plurality of portions, methods of compression for respective divided portions are stored, recompression is performed by changing to a more-efficient method of compression when the compression ratio is insufficient, the recompressed portion is stored in a small-capacity memory, only a portion necessary for development is taken out while being expanded whenever necessary, the taken-out portion is developed and expanded for output while portions not to be developed are stored in compressed form.

It is still another object of the present invention to provide an output method and apparatus, wherein a memory for development is stored while being divided and compressed, and only a necessary portion is utilized while being expanded when the portion is developed and output, whereby the capacity of the memory can be greatly reduced.

DETAILED DESCRIPTION OF THE PREFERRED EMBODIMENTS

A preferred embodiment of the present invention will now be explained in detail with reference to the drawings.

Figure 6:
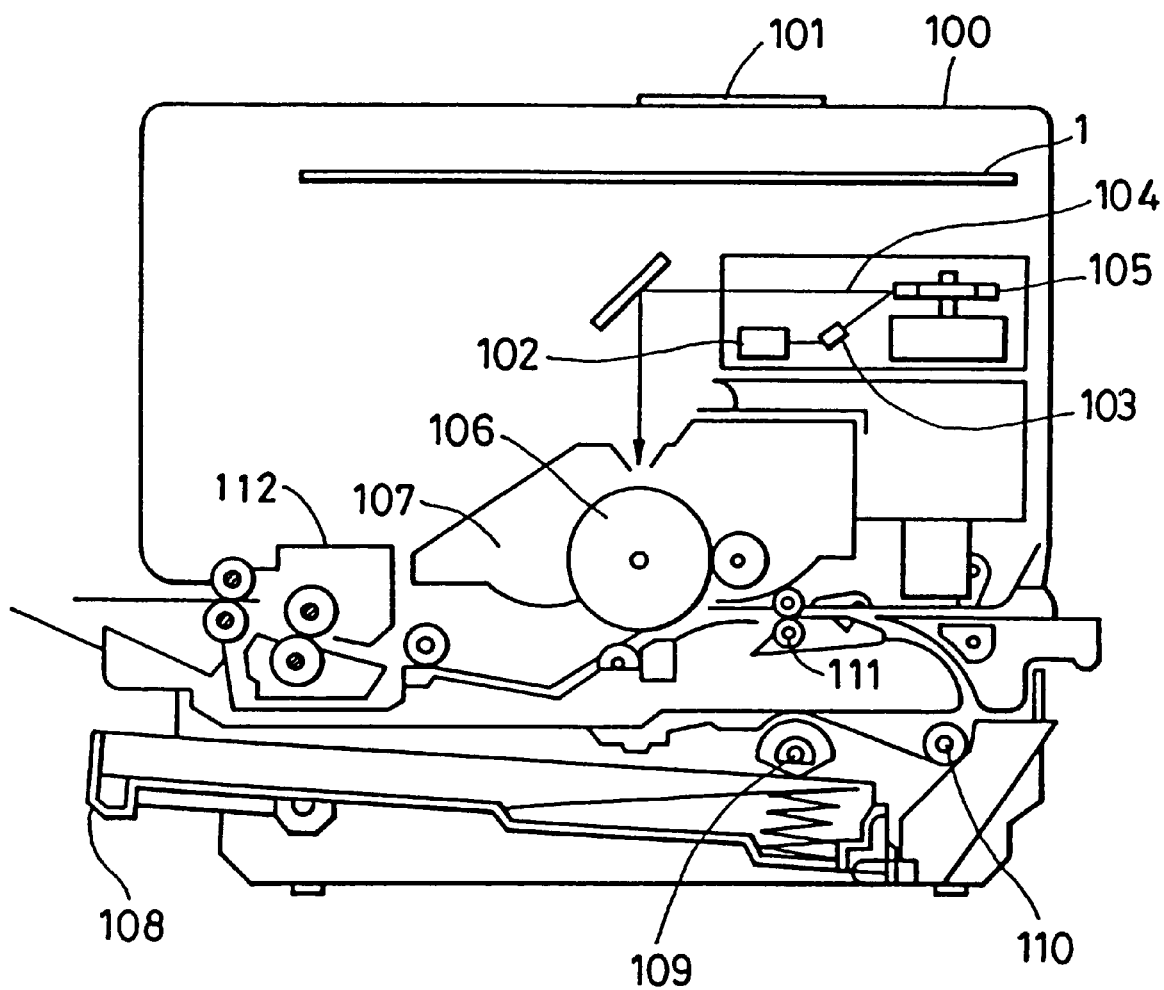
FIG. 6 is a cross-sectional view showing the internal structure of an LBP (laser-beam printer)

Before explaining the configuration of the present embodiment, an explanation will be provided of the configuration of a laser-beam printer to which the present invention is applied with reference to FIG. 6.

FIG. 6 is a cross-sectional view showing the internal structure of the laser-beam printer (hereinafter "LBP") of the present embodiment. Character patterns, a document format (form data) and the like can be registered in the LBP from a data source (not shown). In FIG. 6, a main body 100 of the LBP inputs and stores character information (character codes), form information, macroinstruction and the like supplied from an external apparatus (reference numeral 2 shown in FIG. 1) connected thereto, forms the corresponding character patterns, form pattern and the like in accordance with the above-described information, and forms an image on recording paper, serving as a recording medium. Switches for scanning, LED (light-emitting diode) or LCD (liquid-crystal display) display units and the like are arranged on an operation panel 101. A control unit 1 controls the entire LBP 100 and analyzes the character information and the like supplied from the external apparatus. The control unit 1 converts the character information and the like into video signals of the corresponding character patterns, and outputs the signals to a laser driver 102.

The laser driver 102 is circuitry for driving a semiconductor laser 103, and performs on-off switching of laser light 104 emitted from the semiconductor laser 103 in accordance with the input video signals. The laser light 104 is deflected to the right and left directions by a rotating polygon mirror 105 to scan an electrostatic drum 106. An electrostatic latent image of character patterns is thereby formed on the electrostatic drum 106. The latent image is developed by a developing unit 107 disposed around the electrostatic drum 106, and the developed image is transferred onto recording paper. Recording paper in the form of cut sheets is used. The cut sheets are accommodated in a paper cassette 108 mounted in the LBP 100. Each sheet is fed within the apparatus by a paper feed roller 109 and conveying rollers 110 and 111, and is supplied to the electrostatic drum 106 where the developed latent image is tranferred from the drum to the paper sheet. The transferred image is fixed onto the paper sheet at fixing station 112 and the paper sheet is then ejected.

Figure 1:
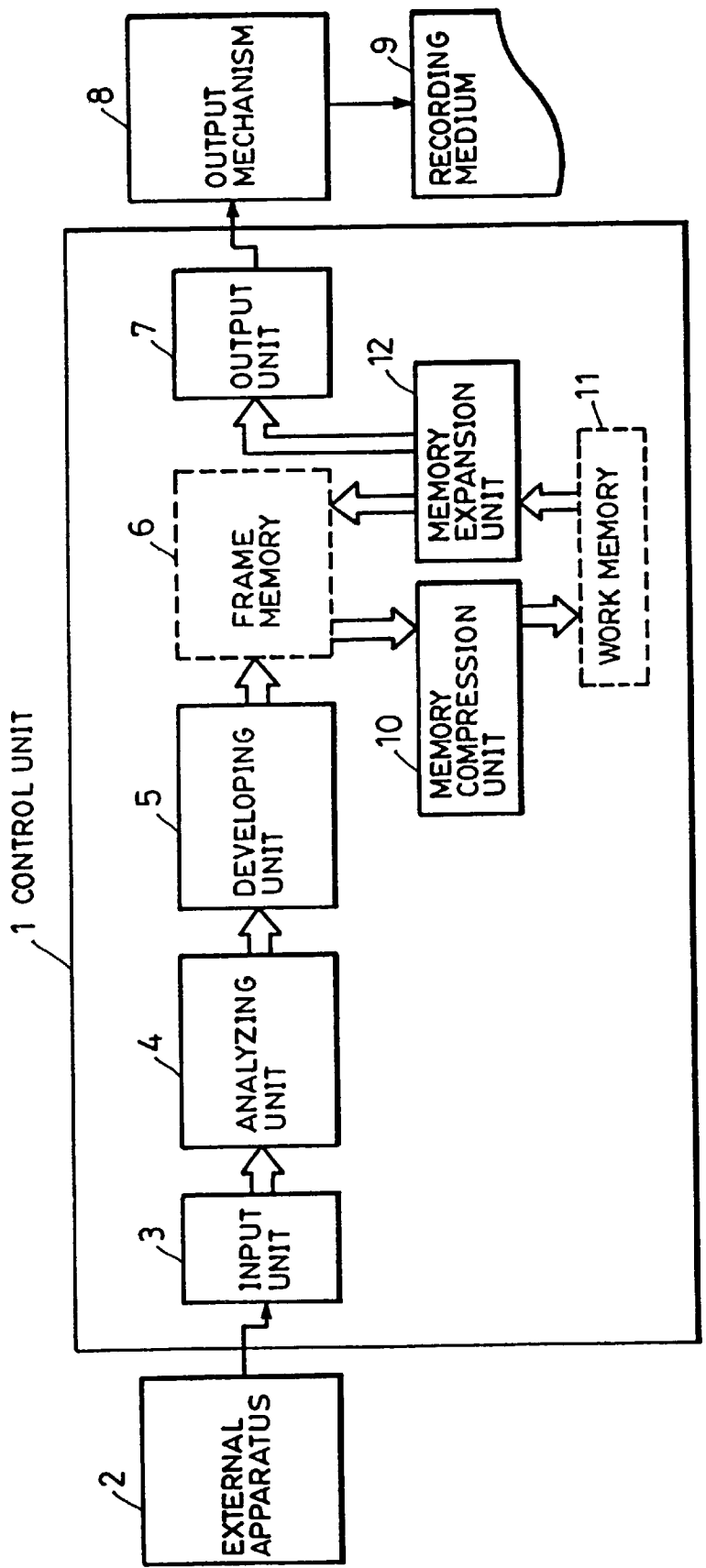
FIG. 1 is a block diagram showing the flow of processing in an output apparatus according to an embodiment of the present invention.
Figure 2:
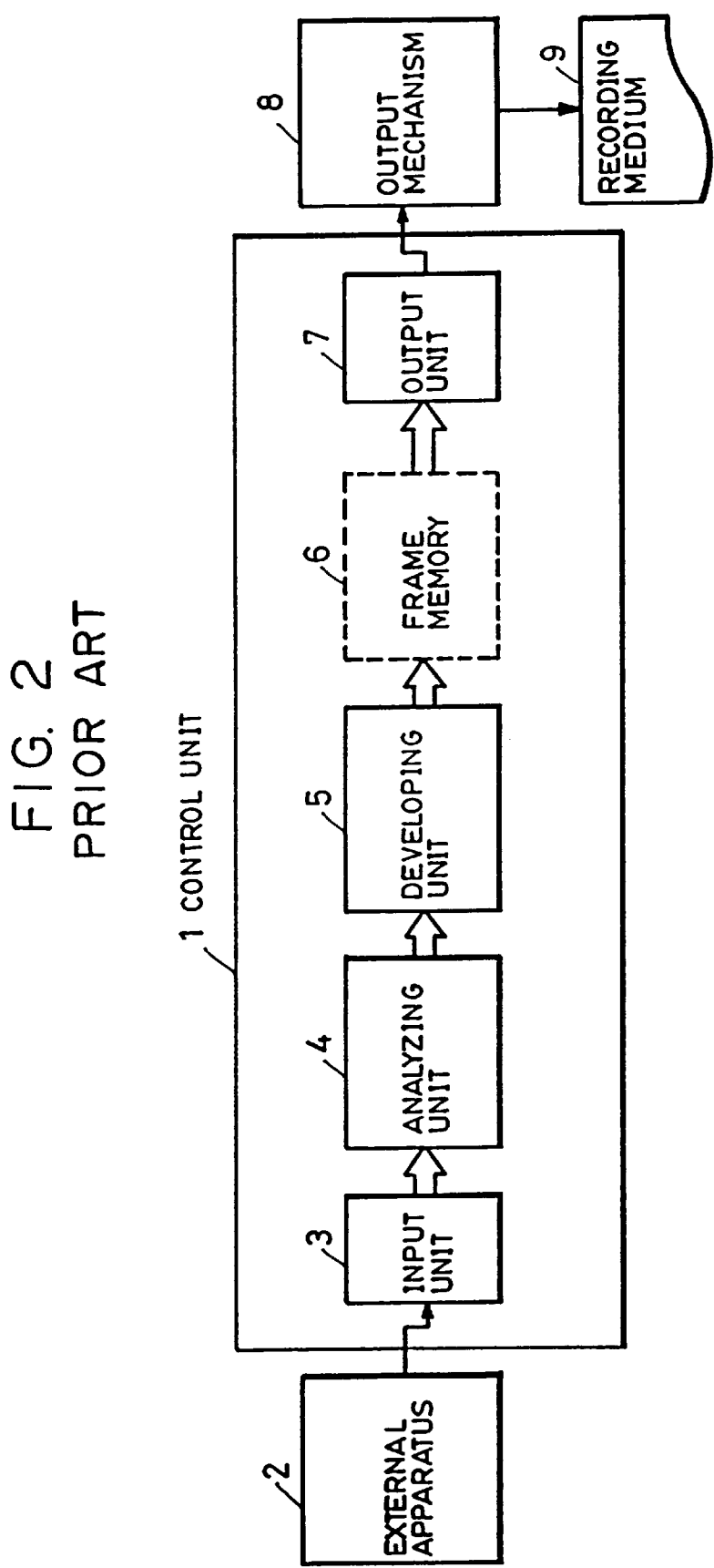
FIG. 2 is a block diagram showing the flow of processing in a conventional printing apparatus.

FIG. 1 is a diagram illustrating the flow of processing of the control unit I shown in FIG. 6. In FIG. 1, there are shown an external apparatus 2, an input unit 3, an analyzing unit 4, a developing unit 5, a frame memory 6, an output unit 7, an output mechanism 8, a recording medium 9, and a memory compression unit 10. A work memory 11 stores compressed data and methods of compression. A memory expansion unit 12 expands a compressed memory. The frame memory 6 is not required to have a capacity for one page, but may only have a capacity for one divided portion. A divided portion may cover, for example, a few scan lines.

In the present embodiment, each divided portion of the image is compressed and stored in work memory 11, and only a portion to be currently developed is taken out and developed. The analyzing unit 4 checks which data input by input unit 3 must be developed in which divided portion (hereinafter termed a paint segment), and transmits information relating the result of the check to the developing unit 5. The developing unit 5 develops an output image in a paint segment of the work memory 11 after expanding the paint segment by the memory expansion unit 12 according to a method of compression preset in the work memory 11 and storing the expanded paint segment in the frame memory 6. Before developing the next output image in the next paint segment, the paint segment currently stored in the frame memory 6 is compressed by the method of compression preset in the work memory 11, and the compressed paint segment is stored in the work memory 11. At that time, if the paint segment is not sufficiently compressed as expected and cannot be stored in the work memory 11, recompression is performed by changing to a more-efficient method of compression, and the method of compression set in the work memory 11 is rewritten.

Development for one page is completed by repeating the above-described processing, whereupon the output unit 7 sequentially takes out paint segments to be output from the work memory 11, expands the taken-out paint segments in the memory expansion unit 12 in accordance with the stored method of compression, and outputs the expanded portions of the output image by a conventional control.

A known algorithm may be used for the above-described compression and expansion. Although the algorithm to be used is not specified, in order to suppress deterioration in an image as much as possible, it is desirable to first use reversible compression, and to use nonreversible compression if high-efficiency compression is needed. For example, ADCT, vector quantization, MH, MR, MMR, Huffman, run length, JBIG or the like may be used as the method of compression. Compression/expansion in the memory compression unit 10 and the memory expansion unit 12 may be performed by programs, or may be performed using certain hardware.

Figure 3:
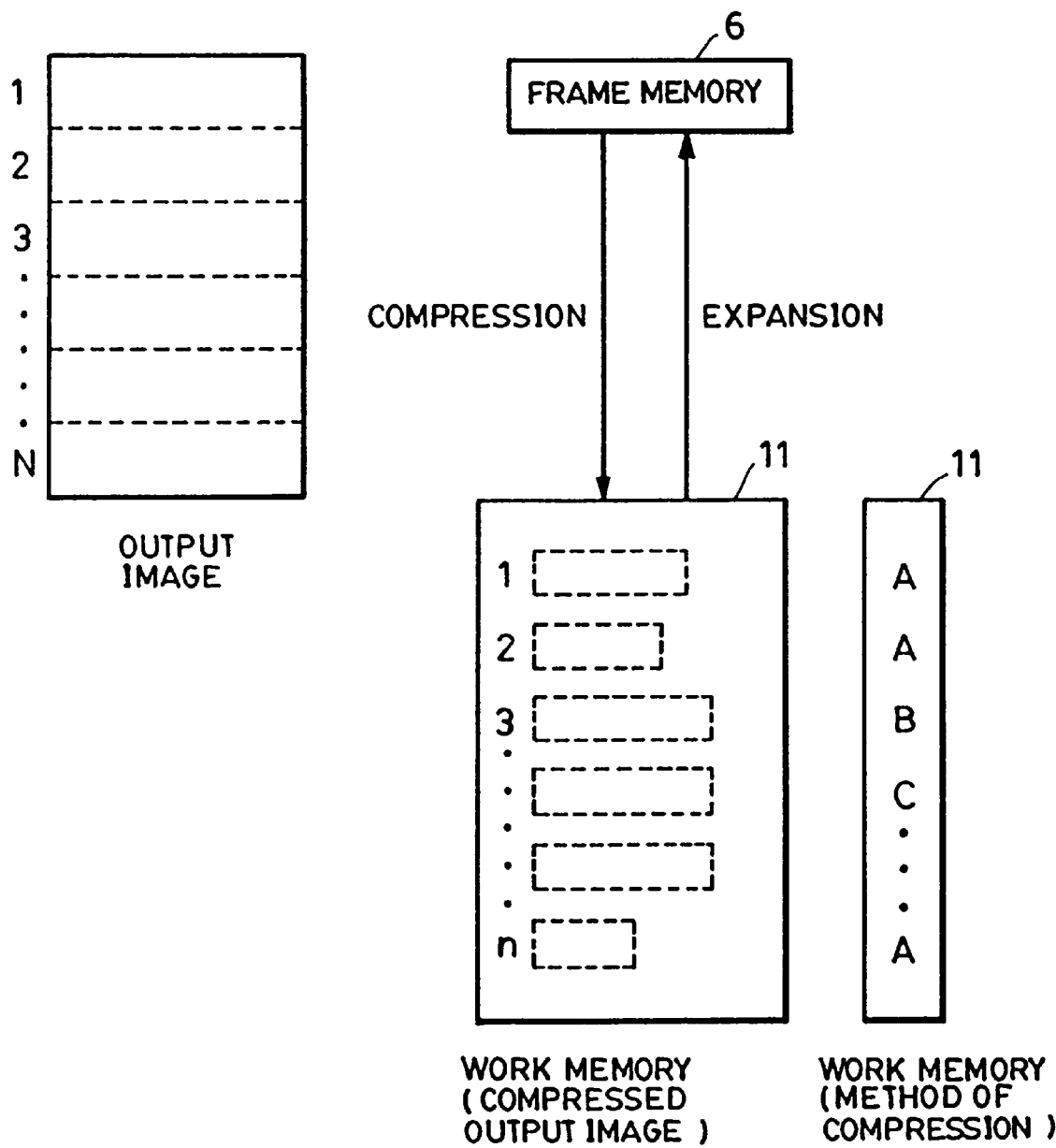
FIG. 3 is a diagram showing the concept of a divided memory.

FIG. 3 is a diagram showing the relationship among an output image, a work memory and a frame memory when an output image for one page is divided into N paint segments. Paint segments (1)-(N) of the output image correspond to compressed output images (1)-(n) stored in the work memory 11, and methods of compression (e.g., methods A, B and C) which are also stored in work memory 11. One of the compressed portions of the output image is expanded and stored in the frame memory.

Figure 4:
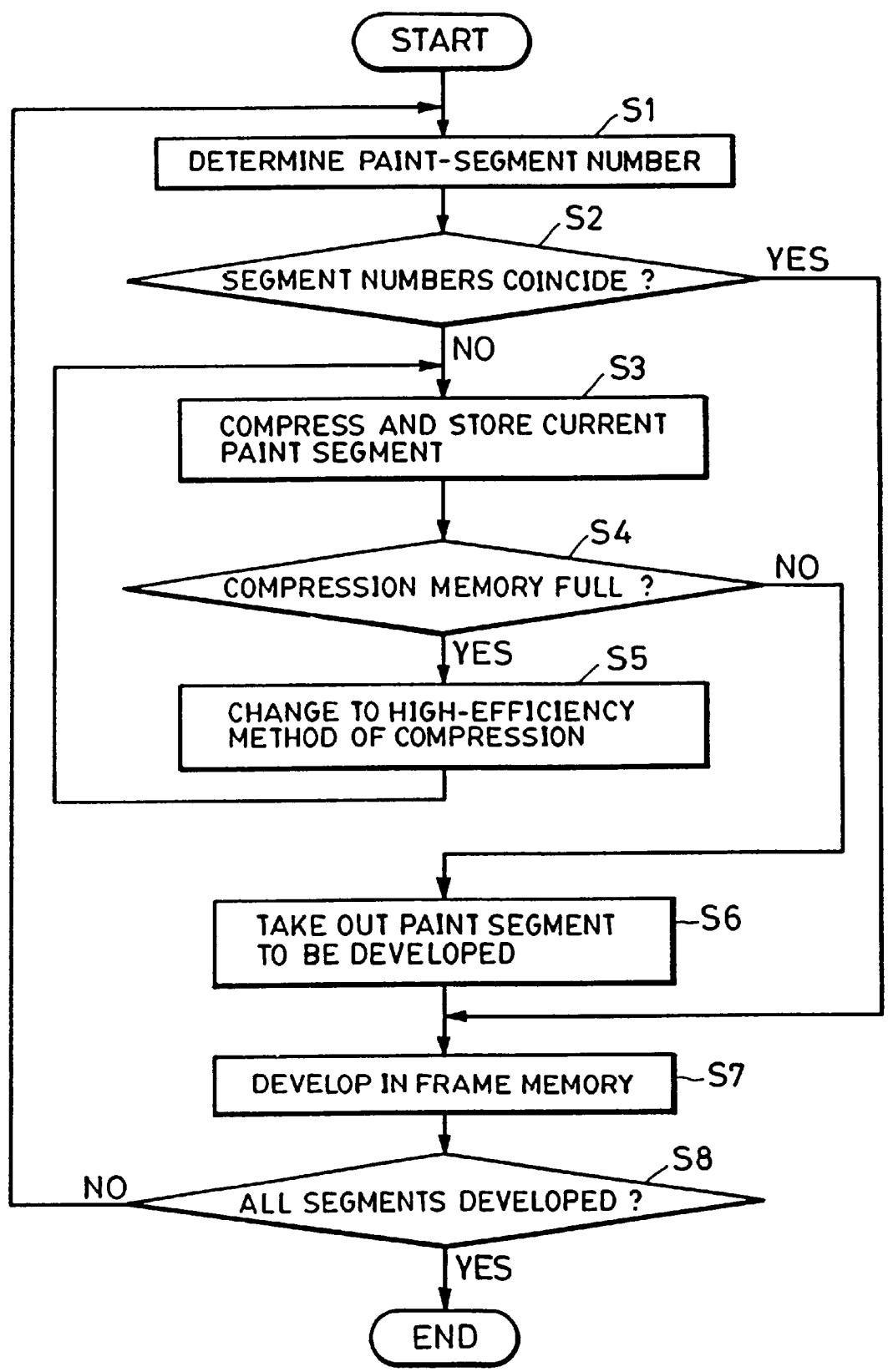
FIG. 4 is a flowchart showing processing in a developing unit.

FIG. 4 is a flowchart showing processing for one page in the developing unit 5. In the developing unit 5, the number of a paint segment to be developed is first determined in step S1. Although not illustrated in FIG. 4, if this is the first development for a page, flow advances directly to step S6 which is described below. On the other hand, if this is not the first development for the page, flow advances to step S2 where it is checked whether or not the number coincides with the number of the currently-developed paint segment. If the result of the check is affirmative, the process proceeds to step S7, where development is performed. If the result of the check is negative, the process proceeds to step S3, where the paint segment stored in the frame memory 6 is compressed by the method of compression, the compressed paint segment is stored in the work memory 11, and the process proceeds to step S4. In step S4, it is checked whether or not the compressed paint segment overflows the work memory 11 (only a short time is required since the capacity of the work memory 11 is small). If the result of the check is affirmative, the method of compression is changed to a high-effeciency method of compression in step S5, the compression method is stored in work memory 11, and the process returns to the processing of step S3. If the result of the check is negative, the process proceeds to step S6, where a necessary paint segment is taken out from the work memory 11 and is expanded, and the process proceeds to step S7.

Development processing is performed in step S7. After the completion of the development, in step S8, it is checked whether or not development has been completed for all the paint segments. If the result of the check is negative, the process returns to step S1. If the result of the check is affirmative, the development processing for the page is terminated.

Figure 5:
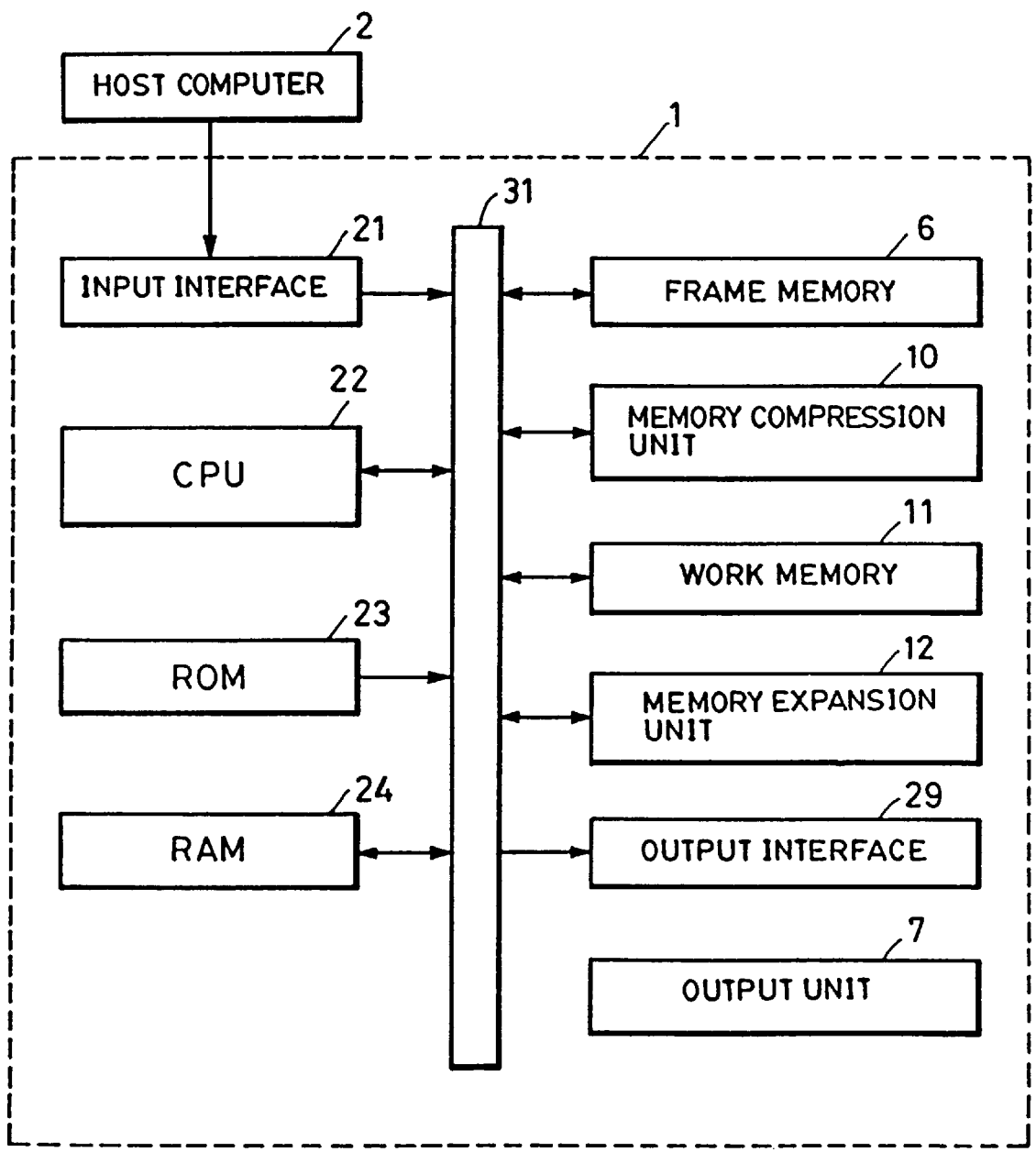
FIG. 5 is a diagram showing a specific configuration of the printing apparatus of the embodiment shown in FIG. 1.

FIG. 5 shows a specific configuration of the control unit 1. In FIG. 5, reference numeral 1 represents the control unit 1. A host computer 2 outputs print information. An input interface 21 (corresponding to input unit 3) inputs the print information from the host computer 2. A CPU 22 controls the entire control unit 1. A ROM (read-only memory) 23 stores processing procedures (a program relating to the flowchart shown in FIG. 4 and the like) for the CPU 22, character-font patterns and the like. A RAM 24 is used as work areas of the CPU 22, and a reception buffer for storing print data received from the host computer 2, and stores page data for constructing an output image for one page from received print information, and the like. A frame memory 6 develops an output image, and comprises a RAM. A memory compression unit 10 compresses data stored in the frame memory 6. The work memory 11 (see FIG. 3) comprises a RAM, and stores a compressed output image and methods of compression. A memory expansion unit 12 expands the compressed data. An output interface 29 outputs the output image to the output unit 7 which actually performs a printing operation. These units are connected to a system bus 31.

As explained above, according to the present embodiment, a memory stores data to be developed that is divided into paint segments and each paint segment is compressed, and only a paint segment necessary for development is taken out and developed. Portions not to be developed, as well as already-developed portions, are stored in compressed form, and are only expanded when being output, whereby it is possible to greatly reduce the capacity of a memory to be used.

Furthermore, since separate methods of compression can be selected for respective divided compressed portions, optimum methods of compression can be selected in accordance with the contents of an output image, and deterioration in the image can thereby be prevented as much as possible.

In the above-described embodiment, a RAM is preferably used, but other storage media, such as hard disks or the like, may be used as a work memory for storing compressed data.

In the above-described embodiment, processing of the output unit is started after development for one page has been completely terminated. However, by performing a control to start output processing of an already-developed paint segment even if development for one page has not been completed, output processing and development processing may be performed in parallel, whereby throughput will be increased.

Figure 7:
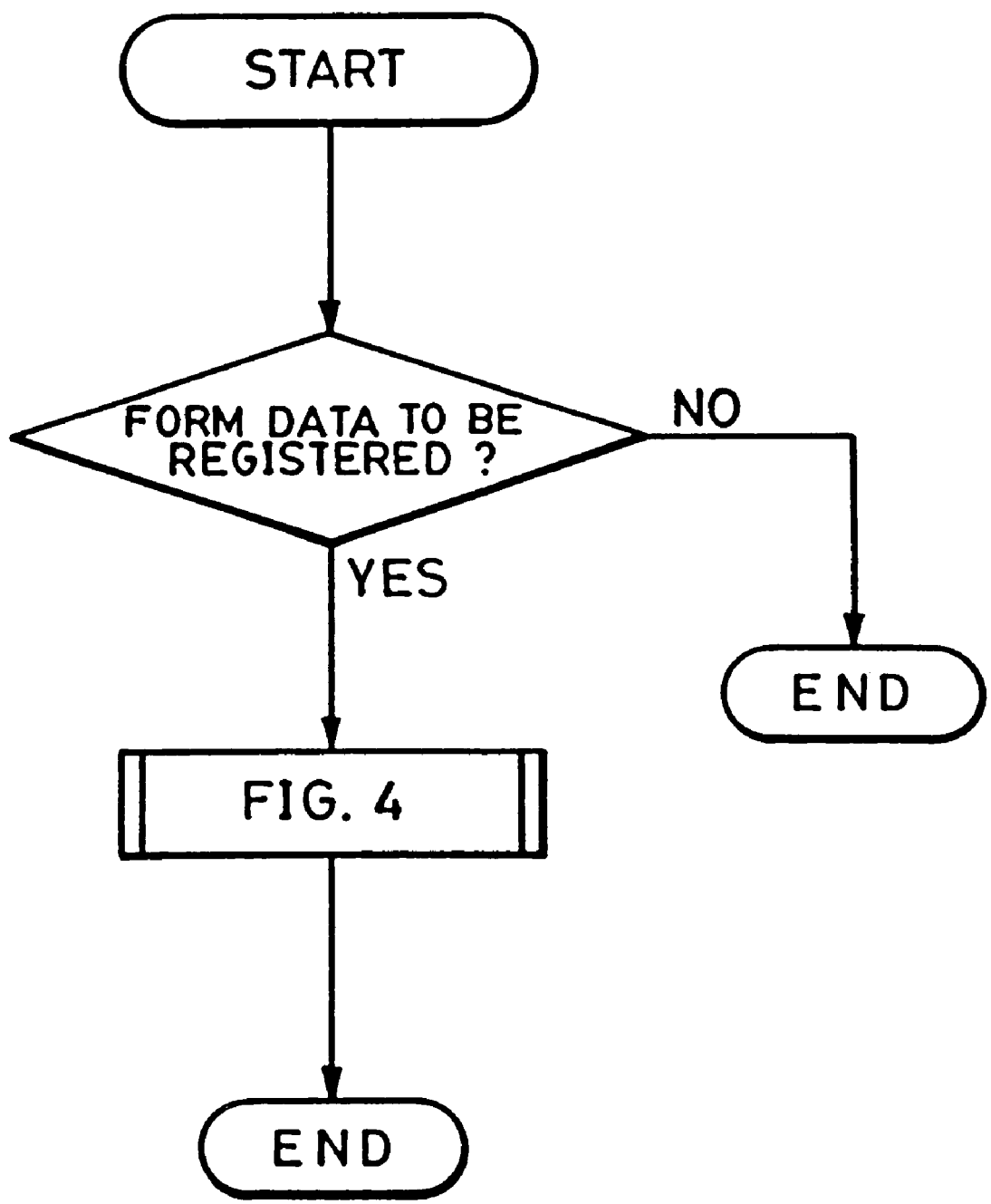
FIG. 7 is a flowchart showing the processing of registration of form data.

Although an image output from the host computer (external apparatus) 2 may be compressed in the above-described manner, the routine shown in FIG. 4 may also be performed when an instruction to register form data from the operation panel 101 or the host computer 2 is present (FIG. 7). This is because it is desired to perform compression by an optimum method and register the form data even though time is needed for such registration. Thus, as shown in FIG. 7, if form data is to be registered, FIG. 4 processing is performed.

Figure 8:
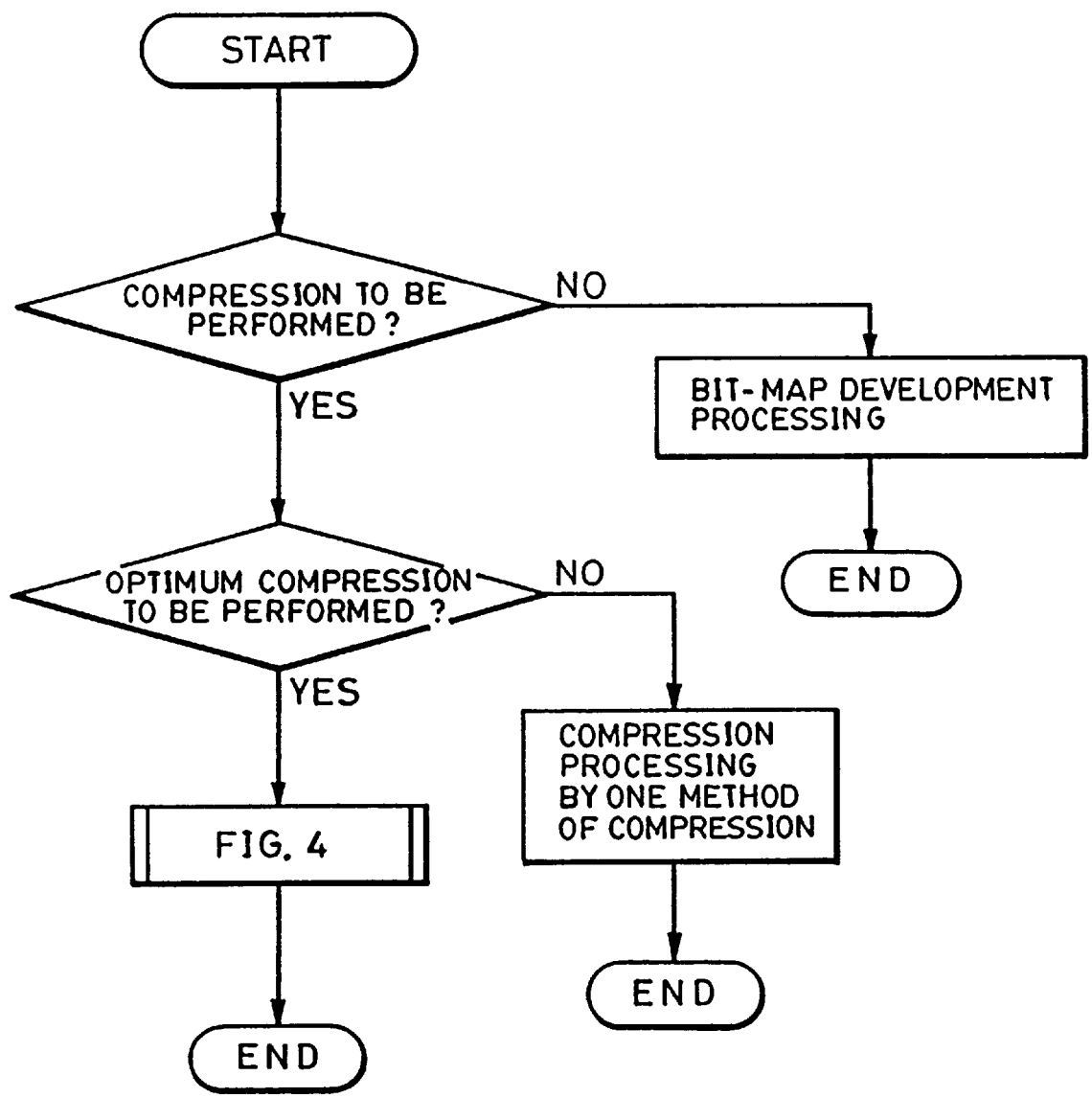
FIG. 8 is a flowchart for determining whether or not compression is to be performed, and whether or not a method of compression is to be switched.

In a normal output of an image, whether or not the above-described FIG. 4 processing is to be performed may be selected in accordance with an instruction from the host computer 2 or the operation panel 101. For example, as shown in FIG. 8, the routine shown in FIG. 4 is selectably performed, whereby (a) optimum compression is performed as shown in FIG. 4, (b) compression is performed by one compression method only, and (c) compression is not to be performed at all.

As explained above, according to the present invention, a memory necessary for development is divided, data in the memory are compressed and stored, and only a portion to be developed is utilized by being expanded, whereby it becomes possible to greatly reduce the capacity of a memory to be used.

Furthermore, an optimum method of compression can be selected in accordance with the contents of an output image, and deterioration in the image can be suppressed as much as possible.

Although, in the above-described embodiment, an explanation has been provided illustrating a laser-beam printer, the present invention is not limited to such a printer, but an ink-jet printer or the like may be used, or a serial printer may also be used. As one type of ink-jet printers, there are bubble-jet printers wherein a change in volume is produced in ink due to the function of thermal energy, and recording is performed by discharging ink drops from orifices.

What is claimed is:

1. A method for developing one page of data to be developed into image data by using a first memory means for storing a segment of image data in a compressed form and a second memory means for storing a segment of image data in an uncompressed form, said method comprising the steps of:

(a) determining whether the segment of uncompressed image data stored in the second memory means is to be compressed based on to which segment a portion of the data to be developed coincides;

(b) when the segment of uncompressed image data stored in the second memory means is to be compressed, compressing the segment of uncompressed image data and storing the resulting compressed image data in the first memory means;

(c) when the segment of compressed image data stored in the first memory means is the segment to which the portion of the data to be developed coincides, and when the segment of uncompressed image data stored in the second memory means is not the segment to which the portion of the data to be developed coincides, expanding the segment of compressed image data and storing the resulting expanded image data in the second memory means; and (d) developing the portion of the data to be developed into the second memory means which stores the resulting expanded image data, which is the segment of image data to which the portion of the data to be developed coincides.

2. The method according to claim 1, wherein the steps (a) to (d) are repeated when there is further data to be developed in the one page.

3. The method according to claim 1, further comprising the step of recognizing the segment to which the portion of the data to be developed coincides.

4. The method according to claim 3, wherein in step (a), when the segment of uncompressed image data stored in the second memory means is not the segment recognized in said recognizing step, it is determined that the segment of uncompressed image data stored in the second memory is to be compressed.

5. The method according to claim 1, wherein in said compressing step, the segment of uncompressed image data is compressed by using one of a plurality of compressing methods.

6. The method according to claim 5, further comprising the step of judging, based on a capacity necessary to store a segment of image data which is compressed by a first compressing method, whether the segment of image data should be compressed by a second compressing method.

7. The method according to claim 6, wherein said first compressing method is a reversible compressing method and said second compressing method is an irreversible compressing method.

8. The method according to claim 1, further comprising the step of outputting the developed image data to printing means after the one page of data is developed.

9. The method according to claim 8, wherein in said outputting step, the segment of compressed image data stored in the first memory means is expanded and output to said printing means.

10. The method according to claim 8, further comprising the step of printing an image by using an electrophotographic method by said printing means.

11. An apparatus for developing one page of data to be developed into image data by using a first memory means for storing a segment of image data in a compressed form and a second memory means for storing a segment of image data in an uncompressed form, said apparatus comprising:

means for determining whether the segment of uncompressed image data stored in the second memory means is to be compressed based on to which segment a portion of the data to be developed coincides;

means for compressing the segment of uncompressed image data stored in the second memory means and storing the resulting compressed image data in the first memory means, when the uncompressed image data stored in the second memory means is to be compressed;

means for, when the segment of compressed image data stored in the first memory means is the segment to which the portion of the data to be developed coincides, and when the segment of uncompressed image data stored in the second memory means is not the segment to which the portion of the data to be developed coincides, expanding the segment of compressed image data and storing the resulting expanded image data in the second memory means; and means for developing the portion of the data to be developed into the second memory means which stores the resulting expanded image data, which is the segment of image data to which the portion of the data to be developed coincides.

12. The apparatus according to claim 1, wherein the determination by said determining means, the compression by said compressing means, the expansion by said expansion means and the development by said developing means are repeated when there is further data to be developed in the one page.

13. The apparatus according to claim 1, further comprising recognizing means for recognizing the segment to which the portion of the data to be developed coincides.

14. The apparatus according to claim 13, wherein when the segment of uncompressed image data stored in the second memory means is not the segment recognized by the recognizing means, the determining means determines that the segment of uncompressed image data stored in the second memory is to be compressed.

15. The apparatus according to claim 1, wherein said compressing means compresses the segment of uncompressed image data by using one of a plurality of compressing methods.

16. The apparatus according to claim 15, wherein said compressing means, based on a capacity necessary to store a segment of image data which is compressed by a first compressing method, judges whether the segment of image data should be compressed by a second compressing method.

17. The apparatus according to claim 16, wherein said first compressing method is a reversible compressing method and said second compressing method is an irreversible compressing method.

18. The apparatus according to claim 1, further comprising means for outputting the developed image data to printing means after data for the page of data is developed.

19. The apparatus according to claim 18, wherein the segment of compressed image data stored in the first memory means is expanded by said expanding means and output to said printing means.

20. The apparatus according to claim 18, wherein an image is output by using an electrophotographic method by said printing means.

21. A method for developing one page of data to be developed into image data by using a first memory means for storing a segment of image data in a compressed form and a second memory means for storing a segment of image data in an uncompressed form, said method comprising the steps of:

(a) determining whether the segment of uncompressed image data stored in the second memory means is a segment to which a portion of the data currently to be developed coincides;

(b) when the segment of uncompressed image data stored in the second memory means is not the segment to which the portion of the data currently to be developed coincides, (i) compressing the segment of uncompressed image data and storing the resulting compressed image data in the first memory means, and (ii) expanding from the first memory means the segment to which the portion of the data currently to be developed coincides, and storing the resulting expanded segment of image data in the second memory means; and (c) developing the portion of the data currently to be developed into the second memory means which stores the resulting expanded segment of image data, to which the portion of the data currently to be developed coincides.

22. The method according to claim 21, wherein the steps (a) to (c) are repeated when there is further data to be developed in the one page.

23. The method according to claim 21, further comprising the step of recognizing the segment to which the portion of the currently data to be developed coincides.

24. The method according to claim 21, wherein in said compressing step, the segment of uncompressed image data is compressed by using one of a plurality of compressing methods.

25. The method according to claim 24, further comprising the step of judging, based on a capacity necessary to store a segment of image data which is compressed by a first compressing method, whether the segment of image data should be compressed by a second compressing method.

26. The method according to claim 25, wherein the first compressing method is a reversible compressing method, and the second compressing method is an irreversible compressing method.

27. The method according to claim 21, further comprising the step of outputting the developed image data to printing means after the one page of data is developed.

28. The method according to claim 27, wherein in said outputting step, the segment of compressed image data stored in the first memory means is expanded and output to said printing means.

29. The method according to claim 27, further comprising the step of printing an image by using an electrophotographic method by said printing means.

30. An apparatus for developing one page of data to be developed into image data by using a first memory means for storing a segment of image data in a compressed form and a second memory means for storing a segment of image data in an uncompressed form, said apparatus comprising:

means for determining whether the segment of uncompressed image data stored in the second memory means is a segment to which a portion of the data currently to be developed coincides;

means for, when the segment of uncompressed image data stored in the second memory means is not the segment to which a portion of the data currently to be developed coincides, (i) compressing the segment of uncompressed image data and storing the resulting compressed image data in the first memory means, and (ii) expanding from the first memory means the segment to which the portion of the data currently to be developed coincides, and storing the resulting expanded image data in the second memory means; and means for developing the portion of the data currently to be developed into the second memory means which stores the resulting expanded segment of image data, to which the portion of the data currently to be developed coincides.

31. The apparatus according to claim 30 wherein the determination by said determining means, the compression by said compressing means, the expansion by said expansion means and the development by said developing means are repeated when there is further data to be developed in the one page.

32. The apparatus according to claim 30, further comprising recognizing means for recognizing the segment to which the portion of the data currently to be developed coincides.

33. The apparatus according to claim 30, wherein said compressing means compresses the segment of uncompressed image data by using one of a plurality of compressing methods.

34. The apparatus according to claim 33, wherein said compressing means, based on a capacity necessary to store a segment of image data which is compressed by a first compressing method, judges whether the segment of image data should be compressed by a second compressing method.

35. The apparatus according to claim 34, wherein the first compressing method is a reversible compressing method, and the second compressing method is an irreversible compressing method.

36. The apparatus according to claim 30, further comprising means for outputting the developed image data to printing means after data for the page of data is developed.

37. The apparatus according to claim 36, wherein the segment of compressed image data stored in the first memory means is expanded by said expanding means and output to said printing means.

38. The apparatus according to claim 36, wherein an image is output by using an electrophotographic method by said printing means.

* * * * *

UNITED STATES PATENT AND TRADEMARK OFFICE
CERTIFICATE OF CORRECTION

PATENT NO. : 6,236,755 B1
DATED : May 22, 2001
INVENTOR(S) : Masami Kashiwazaki

Page 1 of 1

It is certified that error appears in the above-identified patent and that said Letters Patent is hereby corrected as shown below:

<u>Column 7,</u>
Lines 24, 29, 38 and 52, "claim 1," should read -- claim 11, --.

Signed and Sealed this

Twenty-sixth Day of March, 2002

Attest:

JAMES E. ROGAN
*Attesting Officer*     *Director of the United States Patent and Trademark Office*